United States Patent

Boland et al.

[11] Patent Number: 5,889,763
[45] Date of Patent: Mar. 30, 1999

[54] TRANSFER RATE CONTROLLER AND METHOD OF OPERATION

[75] Inventors: Timothy Glenn Boland, Phoenix; Martin Ludwig Dorr, Chandler; Alan Gary Ellis, Phoenix, all of Ariz.

[73] Assignee: Motorola, Inc., Schaumburg, Ill.

[21] Appl. No.: 658,046

[22] Filed: Jun. 4, 1996

[51] Int. Cl.$^6$ .................................................. H04L 12/56
[52] U.S. Cl. ............................................ 370/235; 370/468
[58] Field of Search .................................. 370/412, 395, 370/397, 399, 414, 416, 468, 230, 235

[56] References Cited

U.S. PATENT DOCUMENTS

| | | | |
|---|---|---|---|
| 5,533,020 | 7/1996 | Byrn et al. | 370/60.1 |
| 5,535,301 | 7/1996 | Zheng | 370/60.1 |
| 5,555,265 | 9/1996 | Kakuma et al. | 370/60 |
| 5,602,830 | 2/1997 | Fichou et al. | 370/232 |
| 5,633,870 | 5/1997 | Gaytan et al. | 370/235 |
| 5,712,851 | 1/1998 | Nguyen et al. | 370/399 |

*Primary Examiner*—Chau Nguyen
*Assistant Examiner*—Thinh Vu
*Attorney, Agent, or Firm*—Robert D. Atkins; Lanny L. Parker

[57] ABSTRACT

A transfer rate controller (10) allows the originator of the data to determine when the data is transferred on the communications link. A method of regulating the transfer of ATM cells to maintain rate precision and provide flexibility for dynamically adjusting the rates at which cells are transferred has been described. In accordance with information on the chronology of prior transfers, cell loss priority, set of rate parameters, traffic types, and priorities, a scheduler (12) determines and schedules the relative ordering or placement of virtual connections with respect to one another. The finder (14) selects virtual connections for data transfer. Therefore, the transfer rate controller (10) provides individual transfer rates to virtual connections in accordance with the type of data traffic transferred.

20 Claims, 1 Drawing Sheet

TRANSFER RATE CONTROLLER AND METHOD OF OPERATION

BACKGROUND OF THE INVENTION

The present invention relates, in general, to integrated circuits and, more particularly, to data transfer rate control in communication systems, including Asynchronous Transfer Mode (ATM) systems.

Terminals or end stations using the Segmentation and Reassembly (SAR) portion of an ATM functional circuit can multiplex thousands of Virtual Connections (VCs) to create an outgoing stream of ATM cells. Each cell contains a five-byte header and forty-eight bytes of data. Cell transmission rates for virtual connections in the network ATM transmitting circuit are based on utilization of fixed time intervals or slots in a cell stream. Time intervals may be derived from counters or time slots derived from addressing memory-based tables. For instance, multiple VCs can be linked to hardware implemented counter circuits for providing the time intervals or slots at which VCs are permitted to transmit. However, the fixed counter time interval limits transmission rates for multiple virtual connections, i.e., VCs associated with the same counter may not have individualized rates for transmitting data. Thus, ATM data cell transmit rates are limited by the inflexibility of fixed counter time intervals generated for regulating the transmission of data cells.

When counter based time slots become available, a particular VC is permitted to transmit a cell. Should data not be ready during the specified time slot, a second attempt to transmit the cell is delayed until the counter generates the next time slot. Thus, fixed interval cell transmission rates in accordance with counter time out signals from hardware counters are inefficient.

Static memory tables are programmed for having word locations with entries that select particular VCs. As a pointer marches through the table and accesses a particular location with an entry for a VC, the data cell associated with that VC is transmitted across the link. Thus, the transmission rate for a particular VC is determined by the pace at which the pointer sequentially accesses time slot locations referencing that VC in the memory table. Although the memory table can accommodate different transmission rates for many VCs in accordance with the number of table entries referencing each VC, the precision of the data transmission rate is limited by the size of the memory table and the cyclic operation of the pointer. In particular, when the pointer has accessed the final entry in the memory table, the pointer is returned to the top of the memory table to access the first memory location. This may cause a discontinuity in the rate.

The filled memory table has data values representing the position or the sequence in which VC cells are to be transmitted. When VC cells are not scheduled for transmission, a particular value for a null ATM cell is stored in the location of the memory table representing that time slot. Using memory tables for setting the VC transmission data rates necessitates a relationship between memory table size and transmission rates, i.e., a slow transmission rate associated with a VC requires a large memory table size. Another limitation in regulating transmission cell rates involves the reloading of the memory table to reposition VC references in the memory table as dynamic changes are required. Reconfiguration of the contents of the memory table is required during the time allotted to the transmission of one cell for preventing data loss.

Adjustments for cell data arriving late can not be corrected when using fixed time interval transmission rates such as intervals generated by counters or the memory time slot tables. The transmission of data is delayed until the next selection for transmission is made in accordance with either the count of a counter or a pointer accessing time slots in the memory table.

Accordingly, a need exists for a method of regulating the transmission of ATM cells to maintain rate precision and provide flexibility for dynamically adjusting the rates at which cells are transmitted. It would be advantageous to provide individual transmission rates to a virtual connection in accordance with the type of data traffic transmitted.

DETAILED DESCRIPTION OF THE DRAWINGS

Figure 1:
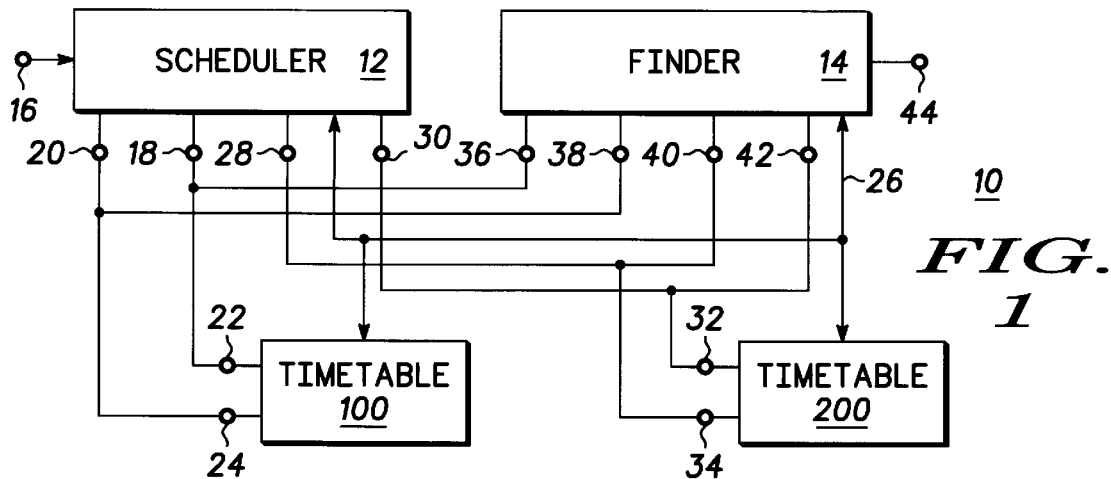
FIG. 1 is a block diagram of a transfer rate controller in accordance with an embodiment of the present invention.

FIG. 1 is a block diagram of a transfer rate controller 10 in accordance with an embodiment of the present invention. Binary data is assembled into a unit, such as an ATM cell of 53 bytes of data and header information, for transfer across a link at a predetermined rate. The words transmit and transmission are used in a general sense to mean transfer and link is any path for movement of data. Transfer rate controller 10 performs, but is not limited to, ATM rate control for traffic types defined by one or more fixed or varying rate parameters, burstiness, and transfer specific parameters, including priority. Transfer rate controller 10 is a configurable rate controller that includes a scheduler 12 and a finder 14 coupled to cell transfer timetables, such as timetables 100 and 200.

Timetables 100 and 200 comprise information storage devices such as latches, registers, memories, dual-port memories, or the like. A number of bits, such as twenty-four bits, form a word in the storage device such that the word length sufficiently identifies a Virtual Connection (VC). Neither the type of storage device nor the size is intended as a limitation of the present invention. The array of storage cells comprising the storage devices within timetable 100 is referred to as a table. Likewise, the array of storage cells comprising the storage devices within timetable 200 is referred to as a table. Table locations, such as memory word locations 111–120 in timetable 100 or locations 211–220 in timetable 200, shown in FIG. 2, can be referred to as entries.

A storage table, such as timetables 100 and 200, is a collection of ordered entries. An entry associates some number of time slots with lists of transfer context designators or virtual connection designators. The number of time slots represented by an entry may be zero (the entry does not represent a time slot). The number of time slots represented by an entry may be one (the entry represents one time slot). The number of time slots represented by an entry may be the number N (the entry represents a time slot group).

Time slot groups represent more than one time slot having similar characteristics. Consecutive time slots may be grouped to form sequential time slot groups. Equal distant time slots may be grouped to form periodic time slot groups. Lists of transfer context designators are used to group transfer contexts of similar characteristics, such as transfer priority in the presence of contention, or association with a specific time slot of a time slot group.

For example, if the number of time slots represented by an entry is one, the entry is associated with only one time slot. If an entry is associated with more than one sequential time slot, the size of the storage table is reduced at the expense of less precision. The number of sequential time slots associated with an entry need not be constant for a specific application or during a specific period of entry use. The preferred embodiment has a one to one relationship between entries and time slots.

Finder 14 of FIG. 1 steps through the tables, such as timetables 100 and 200, for determining if the next memory location containing a VC designator and that VC's priority relative to other VCs to transmit data. Finder 14 and scheduler 12 are coupled to timetables 100 and 200 through finder bus 26. Scheduler 12 is coupled for receiving an input at terminal 16, such as a signal for indicating that data is available for a particular VC and the VC should be scheduled for data transfer. A scheduling request can originate from numerous external agents, including but not limited to, receipt of transmit data from a host system, receipt of receive data from the network, receipt of a network event, and the transition of a reference signal. Scheduler 12 comprises a unit (not shown) that calculates target entries for locations into tables, such as timetables 100 and 200. Another unit (not shown) places a transfer context designator or a virtual connection designator into the calculated target entry or table entry for tables, such as timetables 100 and 200. Another unit (not shown) accepts requests from external agents for scheduling data transfers.

Associated with timetables 100 and 200 are pointers that track cell times in the outgoing cell stream and the location of the VC scheduled for transfer. For instance, the pointer may comprise an address that provides access to a memory word as one entry in the table. In an alternate embodiment, the pointer functions in accordance with a binary one in a field of zeros of a shift register for selecting a particular register in an array of registers comprising a table. Alternately, the pointer is a binary bit in the data field of a memory map that is stored with the VC data structure. As those skilled in the art will appreciate, methods for forming a pointer are varied and not intended as a limitation of the present invention.

Terminals 36, 38, 40, and 42 of finder 14 are coupled for providing pointer outputs, such as pointers TARGET_SLOT_0, SENDING_SLOT_0, TARGET_SLOT_1, SENDING_SLOT_1, respectively. Finder 14 provides and updates all the pointers of transfer rate controller 10. Terminal 44 of finder 14 is coupled for signaling the Segmentation and Reassembly (SAR) with information for cell transfers. Scheduler 12 uses the pointer values for calculating VC transmit time slots. Terminals 18, 20, 28 and 30 for scheduler 12 are coupled for receiving pointer inputs, such as pointers TARGET_SLOT_0, SENDING SLOT_0, TARGET_SLOT_1 and SENDING_SLOT_1, respectively. Terminals 22 and 24 of timetable 100 are coupled for receiving the pointers TARGET_SLOT_0 and SENDING_SLOT_0, respectively. Terminals 32 and 34 of timetable 200 are coupled for receiving the pointers SENDING_SLOT_1 and TARGET_SLOT_1, respectively.

Pointers, such as SENDING_SLOT_0 and SENDING_SLOT_1, are positioned in their tables to signify the location at which VCs are currently being staged for transfer. In particular, when multiple values or VCs are scheduled in the table for timetable 100 at a given storage location or time slot, selecting a VC for transfer does not advance the pointer SENDING_SLOT_0 until all VCs at that table time slot have been sent. Likewise, pointer SENDING_SLOT_1 in timetable 200 does not advance until all VCs at that table time slot have been sent. On the other hand, the pointers TARGET_SLOT_0 and TARGET_SLOT_1 advance one time slot position after each VC or null cell has been transferred to maintain a real-time position that remains current with the transferred cell data stream. A zero value can be used to represent a null cell designator.

In embodiments comprising multiple tables, the primary table has a pointer, such as pointer TARGET_SLOT_0 for timetable 100 and pointer TARGET_SLOT_1 for timetable 200, such that the pointer advances one time slot position after a VC or null cell has been transferred, such as VCs in timetables 100 and 200. Also, each table has a pointer, such as the pointer SENDING_SLOT_0 for timetable 100 and the pointer SENDING_SLOT_1 for timetable 200, such that the pointers only advance when all VCs scheduled in the time slot for that table have been transferred. In particular, upon completion of transferring cells for all VCs in a particular time slot, the pointer SENDING_SLOT_0 advances to the next table location in timetable 100 that either contains a VC designator or matches the location for the pointer TARGET_SLOT_0. Pointer TARGET_SLOT_0 is prevented from incrementing when that incremented value matches the SENDING_SLOT_0 pointer value. Cell transfers for timetable 100 are tracked and permitted to be delayed by a number of cell time slots that equal the pointer range for TARGET_SLOT_0. In one embodiment of the present invention, the pointer TARGET_SLOT_0 comprises eight bits of memory for addressing a table of two-hundred and fifty-six entries, such as timetable 100. Other embodiments have more bits allocated for tracking target and sending slots for preventing the TARGET_SLOT_0 pointer value from incrementing and matching the SENDING_SLOT_0 pointer value. Alternate embodiments providing multiple tables may include two pointers, such as SENDING_SLOT_0 and TARGET_SLOT_0, for the primary table but only include one pointer, such as SENDING_SLOT_1, per table for each of the other tables.

Also, the pointer SENDING_SLOT_1 for timetable 200 only advances when all VCs scheduled in the time slot for that table have been transferred. Upon completion of transferring a VC or null cell in a particular time slot, the pointer SENDING_SLOT_1 advances to the next table location in timetable 200 that either contains a non-zero value or matches the location for the pointer TARGET_SLOT_1. Pointer TARGET_SLOT_1 is prevented from incrementing when that incremented value matches the SENDING_SLOT_1 pointer value. Cell transfers for timetable 200 are tracked and permitted to be delayed by a number of cell time slots that equal the pointer range for TARGET_SLOT_1. For instance, a pointer TARGET_SLOT_1 comprising eight bits of memory allows a maximum delay of two-hundred and fifty-six time slots in transferring VC cells from timetable 200. Again, other embodiments have more bits allocated for tracking target and sending slots for preventing the TARGET_SLOT_1 pointer value from incrementing and matching the SENDING SLOT_1 pointer value.

Transfer rate controller 10 performs rate control for each VC and schedules future cell transfers for VCs. Transfer rate controller 10 scheduling is driven by an external agent, for example, signaling data availability, that optimizes utilization of the assigned portion of the link bandwidth. Priority is assigned to each VC to help resolve contention when multiple VCs are scheduled for the same cell transfer time, thus minimizing the timing conflicts for critical traffic.

Data-driven scheduling is application driven such that when the application makes data available, the VC is scheduled by scheduler 12 to transmit the data. As opposed to device-driven transfers which miss the time slot and transfer opportunity when data is not ready and adhere to strict time interval procedures, data-driven transfers provide for rescheduling the VC as soon as data is available and allowed by the rate and other traffic management parameters.

In this embodiment, one of the functions performed by scheduler 12 is the scheduling of VCs for transferring cells across a communications link. The VC scheduling task is performed in accordance with managing information and properties for multiple VCs such that the placement or order of VCs into the contents of a table, such as timetables 100 and 200 in FIG. 1, determines transfer rates and priorities for each VC. Only one entry or virtual connection designator for a given VC is allowed as a table entry at any given time. The distance between current and prior entries for a given VC in the tables, such as timetables 100 and 200, determines the relative transfer rate for that VC. Also, entries in timetable 100 have a higher priority than entries in timetable 200. For example, VCs representing time critical traffic could have entries into timetable 100 that provide higher priority over types of traffic scheduled into timetable 200.

Information on the chronology of prior transfers, cell loss priority, maximum line transfer rates, traffic types, and priorities for VCs allow scheduler 12 to determine the relative ordering, handling, or placement of VCs with respect to one another.

Figure 2:
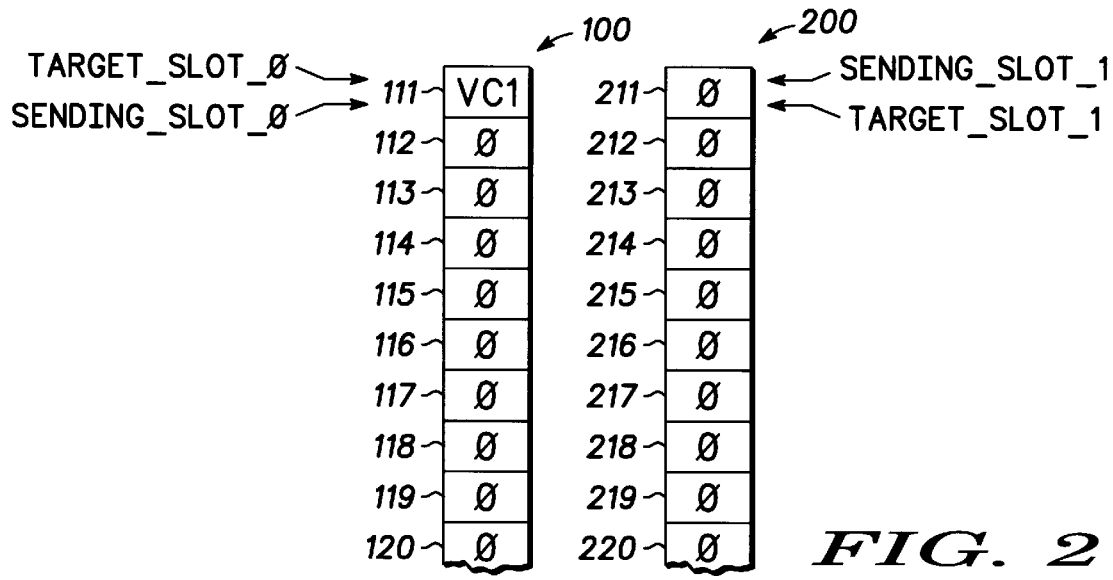
FIGS. 2 and 3 are table entries for a cell transfer timetable of a transfer rate controller in accordance with an embodiment of FIG. 1.

FIG. 2 is a block diagram representing table entries for a transfer rate controller in accordance with an embodiment of FIG. 1. Tables, such as timetables 100 and 200, are shown but the number of tables are not intended as a limitation of the present invention. Cell transfer timetable 100 comprises a table with pointers TARGET_SLOT_0 and SENDING_SLOT_0 accessing table locations, such as 111–120. Cell transfer timetable 200 comprises a table with pointers TARGET_SLOT_1 and SENDING_SLOT_1 accessing table locations such as 211–220. As previously mentioned, table sizes as determined by width and length and the number of table locations or memory words are not a limitation of the present invention.

In operation, timetables 100 and 200 shown in FIG. 2 are filled with particular values for indicating null cells at initialization, i.e., no VCs are scheduled for transfer and only null cell data is transferred. Table entries for timetables 100 and 200 in table locations 112–120 and 211–220, respectively, have an entry of zero for representing a null cell. Finder 14 (see FIG. 1) cycles through the address locations for timetable 100 for the next entry for transfer.

When a VC is established, a set of rate parameters and a traffic type are defined. For example, VC1 may be set up to transmit at one-third the available link cell rate at the priority associated with timetable 100. Scheduler 12 (see FIG. 1) is notified that data is available for VC1 and scheduler 12 determines the location for the next entry of VC1 into timetable 100 in accordance with a set of rate parameters and a traffic type. With no prior history of transfers for VC1, scheduler 12 makes an entry at the location following pointer SENDING_SLOT_0. If SENDING_SLOT_0 is at the location preceding slot 111, a binary code designation for VC1 is entered at table location 111 of timetable 100. The label VC1 represents this binary code and VC1 at location 111 is scheduled as the first cell available for transfer. Cells are transferred in an order consistent with entries and priorities for VCs found in locations as selected by the pointers SENDING_SLOT_0 and SENDING_SLOT_1. Table locations, such as locations 111–120 in timetable 100 or locations 211–220 in timetable 200, are referred to as time slots.

Figure 3:
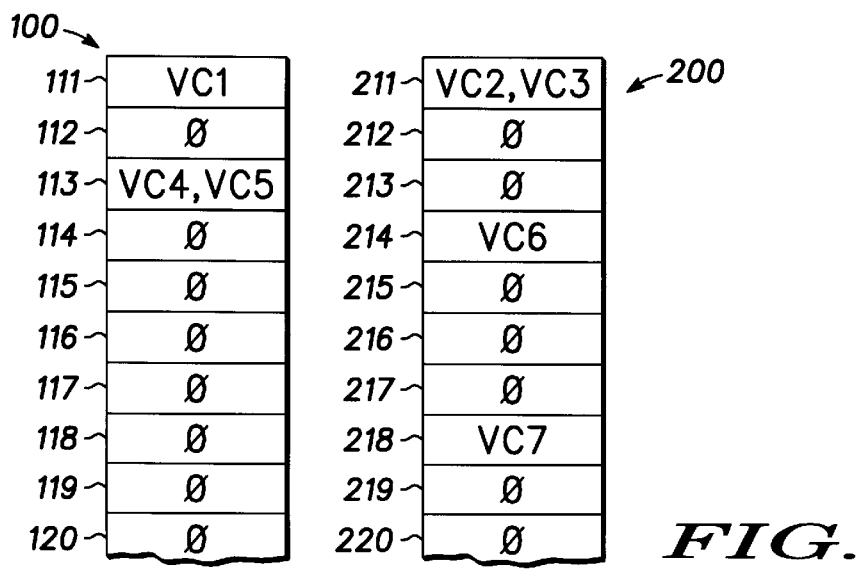

FIG. 3 is a block diagram containing entries for timetables 100 and 200 of transfer rate controller 10 in accordance with an embodiment of FIG. 1. Both timetables 100 and 200 have table locations loaded by scheduler 12 (see FIG. 1) with VC designators. In accordance with information on the chronology of prior transfers, cell loss priority, a set of rate parameters, traffic types, and priorities, scheduler 12 has determined and scheduled the relative ordering or placement of VCs with respect to one another.

In particular, the time slot represented by location 111 of timetable 100 has an entry for VC1. In addition, location 113 has an entry for VC4 and VC5. Other locations, such as locations 112 and 114–120 have entries for the null cell as indicated by a zero in the timetable 100. Location 211 of timetable 200 has entries for VC2 and VC3, location 214 has an entry for VC6, and location 218 has an entry for VC7. Other locations, such as locations 212–213, 215–217, and 219–220 have entries for the null cell as indicated by a zero in the timetable 200. VC1–VC7 are virtual connections with attached properties for designating specific communications of cell traffic across a data link.

With the entries of VC1–VC7 at the specified table locations in timetables 100 and 200, the preferred embodiment of the present invention prescribes the sequence for transferring VC cells in accordance with the location for the entries of VC1–VC7, the null cell designators, and table priorities. For example, pointers TARGET_SLOT_0 and SENDING_SLOT_0 of timetable 100 are selecting location 111 with an entry for VC1. Pointers TARGET_SLOT_1 and SENDING_SLOT_1 of timetable 200 are selecting location 211 with entries for VC2 and VC3. Finder 14 (see FIG. 1) through finder bus 26 steps through the timetables 100 and 200 for the next cell to send.

Finder 14 locates the entry at location 111 for VC1 in timetable 100 and the entries of VC2 and VC3 at location 211 in timetable 200. Multiple entries at a given location indicate conflicts in scheduling VCs for transfer. There are prescribed priorities within a given table for resolving conflicts with multiple entries at a given table location and also priorities between tables such that finder 14 selects VC1 at location 111 in timetable 100 (explained later). Finder 14 outputs the VC1 designator at terminal 44 to initiate transfer.

With the transfer of VC1 from location 111, the pointers TARGET_SLOT_0 and SENDING_SLOT_0 of timetable 100 advance to location 112 which contains a particular value in representing the null cell. TARGET_SLOT_1 advances to location 212 in timetable 200. The transfer of a cell for VC1 acts to clear the value VC1 from location 111 of timetable 100. Then, scheduler 12, in accordance with parameters for VC1 and a schedule request signal for VC1 at terminal 16 (see FIG. 1), calculates an offset value for scheduling the next transfer for VC1 relative to the current location 111 and enters the new VC1 into timetable 100 (not shown). When timetable 100, as the primary table, has pointers SENDING_SLOT_0 and TARGET_SLOT_0 both selecting the same location and the value at that location is for a null cell, priority for transferring VC data is transferred to a secondary table, such as timetable 200.

Still referring to FIG. 3, the pointer SENDING_SLOT_1 at location 211 for timetable 200 contains the values of VC2 and VC3. In accordance with priorities, finder 14 (see FIG. 1) selects the next entry from the list comprised of VC2 and VC3 for transfer. In one embodiment the first entry in the list, VC2, is selected. Other embodiments could use different selection criteria. The designator for VC2 is output at terminal 44 to initiate transfer of a cell for VC2. With the transfer of the cell as represented by VC2 in location 211, the pointer TARGET_SLOT_0 advances to location 113 in timetable 100, the pointer TARGET_SLOT_1 advances to location 213 in timetable 200, and the pointer SENDING_SLOT_1 remains at location 211 in timetable 200. The transfer of the cell for VC2 acts to clear the value VC2 from location 211. Then, scheduler 12, in accordance with parameters for VC2 and a schedule request signal for VC2 at terminal 16, schedules the next transfer for VC2 and makes an entry into the timetable (not shown). Pointer SENDING_SLOT_1 does not advance from location 211 and remains with the value VC3.

Finder 14 locates the pointer SENDING_SLOT_0 at location 113 in timetable 100 and finds values for VC4 and VC5. When values other than the null value are in the location selected by SENDING_SLOT_0, timetable 100 will have a higher priority than timetable 200 for transferring data. Therefore, finder 14 selects location 113 in timetable 100 and the designator for VC4 is output at terminal 44. With the transfer of the cell for VC4 from location 113, the pointer TARGET_SLOT_0 advances to location 114 while the pointer SENDING_SLOT_0 remains at location 113 in timetable 100 with the value VC5. The transfer of data for VC4 acts to clear the value VC4 from location 113. Scheduler 12, in accordance with parameters for VC4 and a schedule request signal for VC4 at terminal 16, schedules the next transfer for VC4 and makes an entry into the table (not shown).

The pointer SENDING_SLOT_0 for timetable 100 is at location 113 which contains the values VC5. Finder 14 (see FIG. 1) selects timetable 100 and location 113 such that the designator for VC5 is output at terminal 44. With the transfer of the cell for VC5 from location 113, the pointer TARGET_SLOT_0 advances to location 115 and the pointer SENDING_SLOT_0 advances to location 115 in timetable 100. The pointer TARGET_SLOT_1 advances to location 215 in timetable 200. The transfer of data for VC5 acts to clear the value VC5 from location 113. Then, scheduler 12, in accordance with parameters for VC5 and a schedule request signal for VC5 at terminal 16, schedules the next transfer for VC5 and makes an entry into the table (not shown).

The pointer SENDING_SLOT_0 at location 115 for timetable 100 contains the particular value for the null cell. Again, when the pointers, such as SENDING_SLOT_0 and TARGET_SLOT_0, are positioned at the same location and the null cell value is at that location, priority for sending data is passed from the primary table, such as timetable 100, to the secondary table, such as timetable 200. Finder 14 (see FIG. 1) finds the location 211 for the pointer SENDING_SLOT_1 in timetable 200. The designator for VC3 is output at terminal 44. With the transfer of VC3 from location 211, the pointers TARGET_SLOT_0 and SENDING_SLOT_0 advance to location 116 in timetable 100, the pointer TARGET_SLOT_1 advances to location 216 in timetable 200, and the pointer SENDING_SLOT_1 advances to location 214 in timetable 200. The transfer of data for VC3 acts to clear the value VC3 from location 211. Then, scheduler 12, in accordance with parameters for VC3 and a schedule request signal for VC3 at terminal 16, schedules the next transfer for VC3 and makes an entry into the table (not shown).

Again, when pointers, such as SENDING_SLOT_0 and TARGET_SLOT_0, are positioned at the same time slot and null data is entered at that location, priority for sending data is passed from the primary table, such as timetable 100, to the secondary table, such as timetable 200. Finder 14 (see FIG. 1) locates the pointer SENDING_SLOT_1 at location 214 with the value VC6 from timetable 200. The designator for VC6 is output at terminal 44. With the transfer of VC6 from location 214, the pointers TARGET_SLOT_0 and SENDING_SLOT_0 advance to location 117 in timetable 100 and the pointers TARGET_SLOT_1 and SENDING_SLOT_1 advance to location 217 in timetable 200. The transfer of data for VC6 acts to clear the value VC6 from location 214. Scheduler 12, in accordance with parameters for VC6 and a schedule request signal for VC6 at terminal 16, schedules the next transfer for VC6 and makes an entry into the table (not shown).

With the pointers TARGET_SLOT_0 and SENDING_SLOT_0 at location 117 in timetable 100 and the pointers TARGET_SLOT_1 and SENDING_SLOT_1 at location 217 in timetable 200, both tables have locations selected that contain a particular value for the null cell. Finder 14 outputs a null-cell designator at terminal 44. When the null cell has transferred, finder 14 steps through timetables 100 and 200 for the next cell to send. With the transfer of the null cell, the pointers TARGET_SLOT_0 and SENDING_SLOT_0 advance to location 118 in timetable 100 and the pointers TARGET_SLOT_1 and SENDING_SLOT_1 advance to location 218 in timetable 200. Again, when the pointer SENDING_SLOT_0 is positioned at the same time slot as the pointer TARGET_SLOT_0 and the null cell value is entered at that location, priority for sending data is passed from the primary table, such as timetable 100, to the secondary table, such as timetable 200. Finder 14 (see FIG. 1) locates the pointer SENDING_SLOT_1 at location 218 and finds the value VC7 in timetable 200. The designator for VC7 is output at terminal 44. With the transfer of VC7 from location 218, the pointers TARGET_SLOT_0 and SENDING_SLOT_0 advance to location 119 in timetable 100 and the pointers TARGET_SLOT_1 and SENDING_SLOT_1 advance to location 219 in timetable 200. The transfer of data for VC7 acts to clear the value VC7 from location 218. Scheduler 12, in accordance with parameters for VC7 and a schedule request signal for VC7 at terminal 16, schedules the next transfer for VC7 and makes an entry into the table (not shown).

With the pointers TARGET_SLOT_0 and SENDING_SLOT_0 at location 119 in timetable 100 and the pointers TARGET_SLOT_1 and SENDING_SLOT_1 at location 219 in timetable 200, both pointers are selecting locations having a value for the null cell. With a null cell entry, finder 14 outputs the null-cell designator at terminal 44. Thus, for this example, data has been transferred in the sequence of VC1, VC2, VC4, VC5, VC3, VC6, null cell, VC7, and null cell. With each transfer the pointers TARGET_SLOT_0 and TARGET_SLOT_1 are advanced such that the pointers remain current with the time slots of the transferred cells in the data stream.

The pointers, such as SENDING_SLOT_0 and SENDING_SLOT_1, remain at a location until clearing all entries from that location. Once entries have been cleared from a location, the pointer SENDING_SLOT_0 advances to the next location with a non zero value within timetable 100 or until matching the location for the pointer TARGET_SLOT_0. When the pointer SENDING_SLOT_0 reaches a non zero value location prior to reaching the location of the pointer TARGET_SLOT_0, the pointer SENDING_SLOT_0 remains at that location until finder 14 selects that location and transfers from that time slot are cleared.

Likewise, the pointer SENDING_SLOT_1 remains at a location until clearing all entries from that location. Once entries have been cleared from a location, the pointer SENDING_SLOT_1 advances to the next location with a non zero value within timetable 200 or until reaching the location for the pointer TARGET_SLOT_1. When the pointer SENDING_SLOT_1 reaches a non zero value location prior to reaching the location of the pointer TARGET_SLOT_1, the pointer SENDING_SLOT_1 remains at that location until finder 14 selects that location and transfers from that time slot are cleared.

The method describing VC selections for transfer, providing priorities when selecting multiple entries from a time slot, providing priorities when selecting from several tables, and dynamically scheduling the next VC for transfer is not limited to the two tables chosen in this example for simplicity. For those skilled in the art, the methods as described are applicable to embodiments with multiple tables. For the embodiment of the present invention, the length of the table does not create rate discontinuities as the pointers SENDING_SLOT_0 and TARGET_SLOT_0 cycle through timetable 100 and entries for VC transfers are again dynamically entered into timetable 100. Likewise, pointers SENDING_SLOT_1 and TARGET_SLOT_1 cycle through timetable 200 and entries for VC transfers are dynamically entered into timetable 200 without creating rate discontinuities.

By now it should be appreciated that transfer rate controller 10 allows the originator of the data to determine when the data is transferred on the communications link. A method of regulating the transfer of ATM cells to maintain rate precision, provide fair access to the link, and provide flexibility for dynamically adjusting the rates at which cells are transferred has been described. In accordance with information on the chronology of prior transfers, cell loss priority, a set of rate parameters, traffic types, and priorities, scheduler 12 has determined and scheduled the relative ordering or placement of VCs with respect to one another. Transfer rate controller 10 provides individual and dynamic control of transfer rates to virtual connections. The maximum number of virtual connections supported by transfer rate controller 10 is determined by the number of unique VC designators that can be coded for a particular embodiment.

What is claimed is:

1. A transfer rate controller comprising:
    first and second storage timetables having memory locations for storing a plurality of transfer context designators of different types;
    a finder having outputs coupled to the first and second storage timetables for providing pointer signals that select one of the plurality of transfer context designators and cause a transmission of data represented by the one of the plurality of transfer context designators; and
    a scheduler coupled to the first and second storage timetables for dynamically scheduling the storage of another transfer context designator at another memory location when data corresponding to the another transfer context designator is available for transmission.

2. The transfer rate controller of claim 1, wherein a first transfer context designator stored at a first memory location in the first storage timetable has a higher priority for data transfer than a second transfer context designator stored at a second memory location in the second storage timetable.

3. The transfer rate controller of claim 2, wherein the first memory location is selected by a first pointer signal.

4. The transfer rate controller of claim 3, wherein the second memory location is selected by a second pointer signal.

5. The transfer rate controller of claim 1, wherein the scheduler schedules the first transfer context designator in accordance with a traffic type.

6. The transfer rate controller of claim 1, wherein the scheduler schedules the first transfer context designator in accordance with a set of rate parameters.

7. A method of scheduling virtual connections, the method comprising the steps of:
    providing a cell transfer timetable, the cell transfer timetable containing an array of storage devices;
    providing a scheduler coupled to the cell transfer timetable;
    providing a finder coupled to the cell transfer timetable;
    scheduling a first virtual connection;
    entering a first virtual connection designator as an entry into the cell transfer timetable;
    advancing a pointer signal provided by the finder through memory storage locations of the cell transfer timetable until reaching the first virtual connection designator;
    outputting the first virtual connection designator;
    calculating a location for a second virtual connection designator;
    scheduling a second virtual connection when data is available;
    removing the first virtual connection designator from the cell transfer timetable; and
    entering the second virtual connection designator as an entry into the cell transfer timetable.

8. The method of claim 7 wherein the step of advancing through the cell transfer timetable for the first virtual connection designator comprises the step of inspecting the cell transfer timetable using the finder.

9. The method of claim 7 wherein the step of scheduling the first virtual connection designator and the second virtual connection designator comprise the step of scheduling with the scheduler.

10. A method of providing a priority in transferring cells across a data link comprising the steps of:
    providing a plurality of timetables;
    providing a first pointer at a first memory location of a first timetable;
    providing a second pointer at a second memory location of the first timetable;
    providing a third pointer at a third memory location of a second timetable;
    transferring a first cell in accordance with a first transfer context designator located by the second pointer at the second memory location;
    incrementing the first pointer to a next memory location of the first timetable after transferring the first cell;
    transferring a second cell in accordance with a second transfer context designator located by the second pointer at the second memory location of the first timetable when there are multiple values at that location; and
    advancing the second pointer.

11. The method of claim 10 wherein the step of advancing the second pointer further includes advancing the second pointer to a location containing a transfer context designator that is not a null cell designator.

12. The method of claim 10 wherein the step of advancing the second pointer further includes advancing the second pointer past null cell designators stored in the first timetable to a location matching the location of the first pointer.

13. The method of claim 10 further comprising the step of removing the first transfer context designator from the first timetable after transferring the first cell.

14. The method of claim 10 further comprising the steps of:
providing a fourth pointer at a fourth memory location of the second timetable; and
incrementing the fourth pointer located at the fourth memory location after transferring the first cell.

15. The method of claim 10 further comprising the steps of:
passing priority for transferring a third cell that is stored in the second timetable and located by the third pointer when the first pointer and the second pointer of the first timetable have matching locations and are at an entry for a null cell; and
transferring the third cell first value located by the third pointer at a third memory when a third transfer context designator is not an entry for the null cell.

16. The method of claim 15 further comprising the steps of:
transferring a fourth cell stored in the second timetable when there are multiple values at the third memory location and the first pointer and the second pointer are at a same memory location in the first timetable and have a null cell value at the same memory location; and
passing priority for transferring another cell to a location of the second pointer in the first timetable when the transfer context designator located by the second pointer is not an entry for the null cell value.

17. The method of claim 10 further comprising the step of scheduling a time for sending a transfer context designator by entering another transfer context designator corresponding to the second transfer context designator into the first timetable in accordance with a traffic type.

18. The method of claim 10 further comprising the step of scheduling a time for sending a transfer context designator by entering another transfer context designator corresponding to the second transfer context designator into the first timetable in accordance with a chronology of prior transfers for a virtual connection.

19. The method of claim 10 further comprising the step of scheduling a time for sending a transfer context designator by entering another transfer context designator corresponding to the second transfer context designator into the first timetable in accordance with a set of rate parameters.

20. The method of claim 10 further comprising the step of scheduling a time for sending a transfer context designator by entering another transfer context designator corresponding to the second transfer context designator into the first timetable in accordance with a cell loss priority.

* * * * *

UNITED STATES PATENT AND TRADEMARK OFFICE
CERTIFICATE OF CORRECTION

PATENT NO. : 5,889,763

DATED : March 30, 1999

INVENTOR(S) : Timothy Glenn BOLAND et al.

It is certified that error appears in the above-identified patent and that said Letters Patent is hereby corrected as shown below:

On the title page, item [21],
Application number is incorrect, delete "658,046" and replace with --08/658,046--.

In claim 15, column 11, line 17, delete "first value located by the third".

In claim 15, column 11, line 18, delete "pointer at a third memory".

Signed and Sealed this

Twenty-third Day of November, 1999

Attest:

Q. TODD DICKINSON

Attesting Officer

Acting Commissioner of Patents and Trademarks